United States Patent
Nguyen

(10) Patent No.: US 8,719,901 B2
(45) Date of Patent: May 6, 2014

(54) SECURE CONSULTATION SYSTEM

(75) Inventor: Van Q. Nguyen, Dublin, CA (US)

(73) Assignee: Synopsys, Inc., Mountain View, CA (US)

( * ) Notice: Subject to any disclaimer, the term of this patent is extended or adjusted under 35 U.S.C. 154(b) by 1015 days.

(21) Appl. No.: 12/257,998

(22) Filed: Oct. 24, 2008

(65) Prior Publication Data

US 2010/0107220 A1    Apr. 29, 2010

(51) Int. Cl.
*G06F 21/00*  (2013.01)

(52) U.S. Cl.
USPC ........ 726/3; 726/9; 726/15; 726/27; 713/155; 713/169; 713/171

(58) Field of Classification Search
USPC ......... 726/2, 3, 27; 380/201, 277; 713/2, 185, 713/201, 168
See application file for complete search history.

(56) References Cited

U.S. PATENT DOCUMENTS

| | | | |
|---|---|---|---|
| 2002/0124186 A1* | 9/2002 | Goto et al. | 713/201 |
| 2003/0056063 A1 | 3/2003 | Hochmuth | |
| 2004/0015724 A1* | 1/2004 | Pham et al. | 713/201 |
| 2004/0049702 A1 | 3/2004 | Subramaniam | |
| 2004/0093397 A1* | 5/2004 | Chiroglazov et al. | 709/219 |
| 2004/0221179 A1* | 11/2004 | Seshadri | 713/202 |
| 2005/0132221 A1 | 6/2005 | Marcjan | |
| 2008/0034209 A1* | 2/2008 | Dickinson et al. | 713/168 |
| 2008/0104715 A1* | 5/2008 | Saka et al. | 726/31 |

OTHER PUBLICATIONS http://eprint.iacr.org/2013/429.pdf "DupLESS: Server-Aided Encryption for Deduplicated Storage"—Sep. 2006, Bellare et al, IACR.*
http://csrc.nist.gov/publications/nistpubs/800-111/SP800-111.pdf "Guide to Storage Encryption Technologies for End User Devices"—Scarfone et al, NIST, Jun. 2007.*

* cited by examiner

*Primary Examiner* — Randy Scott
(74) *Attorney, Agent, or Firm* — Park, Vaughan, Fleming & Dowler LLP

(57) ABSTRACT

A secure consultation system is disclosed that enables an owner entity to securely store its most secure and private data such that designated entities of the owner entity and a consultant entity can execute application programs on that data and thus, to consult on the operation and correctness of the application programs and the data.

18 Claims, 3 Drawing Sheets

SECURE CONSULTATION SYSTEM

CROSS-REFERENCE TO RELATED APPLICATIONS

U.S. patent application Ser. No. 11/972,521, titled "Method and Apparatus for Determining the Timing of an Integrated Circuit Design", filed Jan. 10, 2008, having inventors Mang et al., published as United States Patent Application Publication: US 2008/0168411 A1, published Jul. 10, 2008, is hereby incorporated by reference in its entirety as non-essential material to provide background information about Electronic Design Automation (EDA) software.

BACKGROUND

1. Technical Field

The disclosed technology relates to the field of secure consultation systems.

2. Related Art

Designing integrated circuits is complex and difficult. Electronic Design Automation software provides design automation tools to assist designers of integrated circuits. These tools assist the designer in the creation of design data (for circuit design modules) that can eventually be embodied in an integrated circuit. EDA software attempts to model and validate the circuit design prior to the actual fabrication of the first integrated circuit to that design. The design data generated by the use of EDA software contains the intellectual property of the designer. This intellectual property is extremely valuable, and is zealously protected and is considered by the designer to be their most secure and private data and is thus sensitive data. If the intellectual property becomes known, a competitor can more quickly compete in the marketplace.

EDA software is complex, and even designers who are experienced in its use sometimes need to consult with the developers of the EDA software or with those who have libraries of design data used by the designer. However, obtaining assistance from a consultant entity about an owner's problem with the EDA software (and/or other application program) related to a given design often requires the owner entity of the design to expose their sensitive data used or generated by the EDA software to the consultant entity's technical team.

Such a disclosure increases the risk that the design could be misappropriated. Misappropriation can occur by interception of the sensitive data if it is mailed, couriered, or transmitted over a network, as well as by unauthorized access to the data by rogue persons associated with the consultant entity or the owner entity. In some situations this disclosure could be considered to be a public disclosure and thus vitiate trade secret assertions as to the design. Thus, there is a need for some mechanism to enable the consultant entity to be able to assist the owner entity regarding the owner's problem while keeping the owner entity's sensitive data secure, thus minimizing risk to the owner entity.

In general, however, the consultant entity services multiple owner entities. Thus, the consultant entity must insure that the sensitive data of each owner entity is completely and verifiably kept secret from other owner entities. Each owner entity's sensitive data must be protected against threats that originate within the consultant entity, as well as threats that originate outside the consultant entity. For example, the owner entity's sensitive data must be protected even against trusted site administrators, system administrators, or other privileged users of the consultant entity.

While contractual agreements between the owner entity and the consultant entity can specify damages for the owner entity if the sensitive data is compromised by the consultant entity, proving how, who, and when is difficult, and any damages that may be obtained are often long delayed.

The facility and technology disclosed herein has been used by Synopsys since 2004 and has been made available to selected Synopsys customers since that time under a non-disclosure agreement. This technology has been a factor in closing business deals and has contributed significant revenue to Synopsys. It satisfies a long-standing need in the field of secure consultation systems and is well respected by the companies to which Synopsys has provided the facility.

DETAILED DESCRIPTION

The technology disclosed herein is a secure consultation system that enables an owner entity to securely store its most secure and private data such that designated personnel of the owner entity and a consultant entity can execute application programs on that data and to consult on the operation and correctness of the application programs when applied to the sensitive data. The secure consultation system includes a secure network and a local firewall that is in communication with a local network and the secure network. The local firewall is configured to pass virtual private network communications between the local network and the secure network. The secure consultation system also includes an intrusion detection appliance in communication with the secure network, and is configured to detect an unauthorized network operation in the secure network. Also, a cryptographic key server is in communication with the secure network, and is configured to provide cryptographic services for use within the secure network. The secure consultation system also includes a sensitive data storage that is in communication with the secure network and is configured to store sensitive data within an owner mount point on the sensitive data storage. The sensitive data is encrypted when stored in the sensitive data storage. In addition, an application program storage is in communication with the secure network, and is configured to store an application program. The secure consultation system also includes a compute server that is in communication with the secure network and is configured to retrieve and execute the application program from the application program storage. The application program is configured to process the sensitive data. The compute server is further configured with a virtual network computing server. The application program is configured to process the sensitive data when invoked by an authenticated and authorized user. In addition, a virtual private network gateway is in communication with the secure network, and is configured to extend the secure network through the local firewall to enable a virtual network computing client external to the secure network to communicate with the virtual network computing server.

Figure 1:
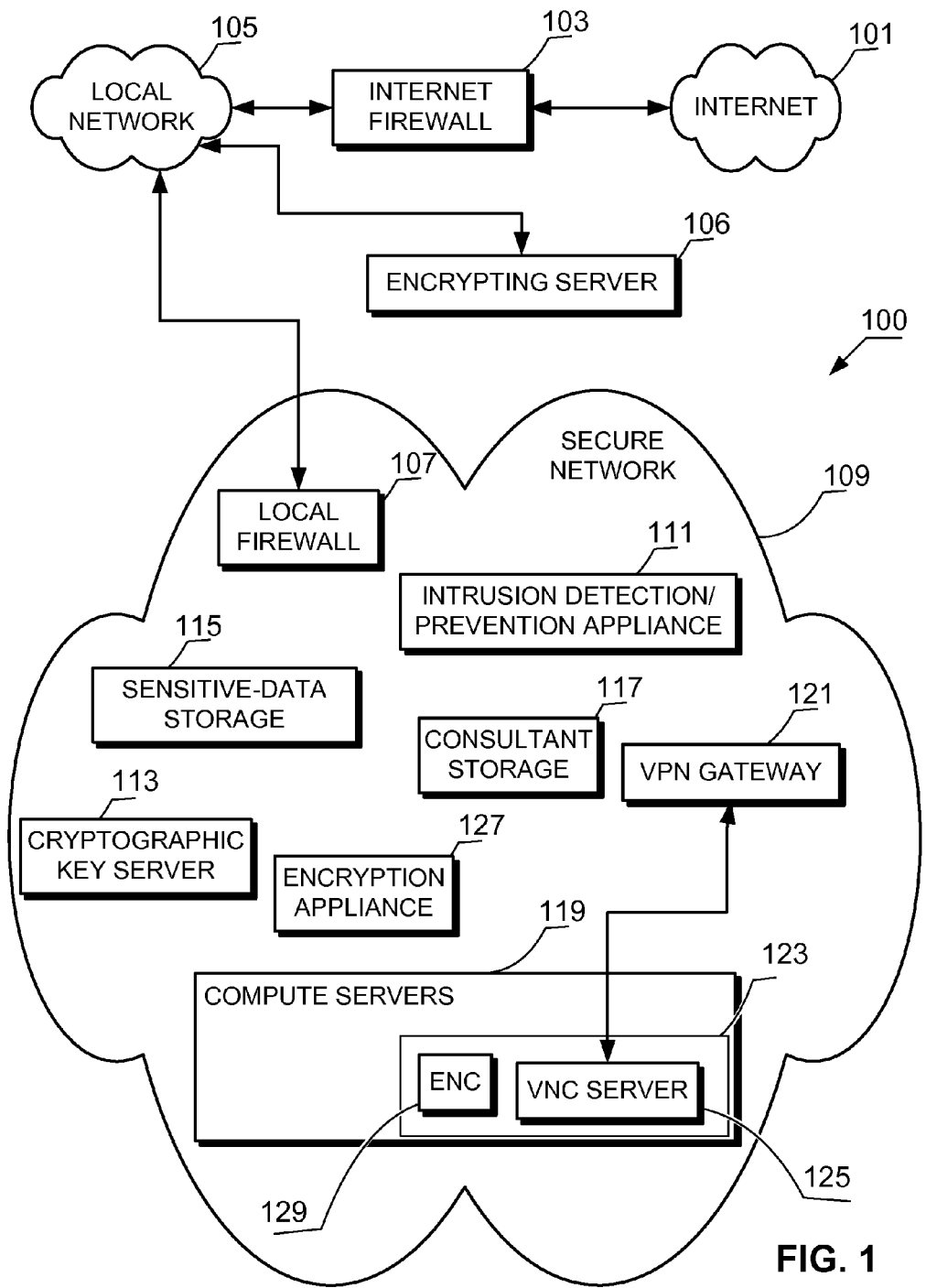
FIG. 1 illustrates a secure consultation system site.

FIG. 1 illustrates a secure consultation system site 100 that can be used to allow owner entity personnel and consultant entity personnel to cooperate in efforts to resolve an owner's problem that the owner entity may have when applying EDA or related application programs to the owner entity's sensitive data. The secure consultation system site 100 can usually communicate with an internet 101 (such as the Internet). An internet firewall 103 protects a local network 105 from the internet 101 as is well known in the art. The local network 105 enables communication between a variety of computing equipment and other networked appliances, again as is known in the art. These connections can include an encrypting server 106 and a local firewall 107. The local firewall 107 controls access from the local network 105 to a secure network 109 and prohibits unauthorized intrusion attempts into the secure network 109 from the local network 105. The secure network 109 is a separate, physically isolated network.

As will be subsequently described, access from the local network 105 to the secure network 109 through the local firewall 107 is extremely limited. In addition, the packets flowing within the secure network 109 are monitored by an intrusion detection/prevention appliance 111 to detect and (in some embodiments) prevent unauthorized network operations originating from within the secure network 109, thus helping detect whether an appliance connected to the secure network 109 has been compromised (for example, by a virus, or by an authenticated and authorized user performing prohibited operations). The secure network 109 also includes a cryptographic key server 113 that provides cryptographic services needed to protect (for example) the owner entity's sensitive data that resides in the sensitive data storage 115 and that supports other cryptographic operations used within the secure network 109. These services can include the generation and provision of symmetric keys used within the secure network 109.

A consultant storage 117 is used to store application programs and data provided/used by the consultant entity. Personnel representing the consultant entity and the owner entity can reproduce the owner's problem by applying these application programs to the owner entity's sensitive data. Consultant entity personnel and owner entity personnel can execute these application programs using a computer from a compute server bank 119. Access to the compute server bank 119 resources can be through a VPN gateway 121. The authenticated and authorized users of the owner entity and the consultant entity do not have direct access to the sensitive data stored on the sensitive data storage 115. Instead, application programs that execute on the allocated compute server 123 provide a presentation to the user of the user interface rendered by the application program as it operates on the sensitive data. The sensitive data storage 115 is organized into shares (exports). The appropriate share containing the owner entity's sensitive data is an owner mount point that can be mounted by an authenticated and authorized user of the allocated compute server 123. The owner entity's sensitive data is prohibited from being moved, copied, or otherwise stored outside the owner mount point assigned to the owner entity. Thus, this data cannot be transferred to a tangible storage media. Further, the intrusion detection/prevention appliance 111 and/or the local firewall 107 prohibit this data from being transferred outside the secure network 109.

The secure network 109 is preferably completely arrayed within a secure physical location to which only authenticated and authorized people are allowed access. Such access can be allowed and logged by using access procedures (for example, using keycard and biometric authentication techniques), as is known by one skilled in the art. Electronic access for authenticated and authorized users can be through a virtual private network (VPN) to a virtual network computing server 125 (a VNC server) on the allocated compute server 123.

The consultant entity's personnel and the owner entity's personnel debug and test the application programs against the owner entity's sensitive data to resolve the owner's problem. Generally the allocated compute server 123 can only mount a single owner mount point, and only authenticated and authorized users for that owner mount point can log in to the allocated compute server 123.

The secure network 109 protects against internal and external threats to the owner entity's sensitive data, because this data is physically located in a known and secure physical location, is encrypted in the sensitive data storage 115, cannot be copied out of the secure network 109, cannot be copied outside the owner mount point, and cannot be copied into tangible media (that could be removed from the secure physical location). Thus, external threats from rogue personnel of either the owner entity or the consultant entity are foiled. In addition, site administrators, system administrators, or other privileged users of the secure network 109 and the secure physical location are prohibited from viewing the sensitive data so that internal threats by rogue, but trusted, personnel are also foiled. Furthermore, all access to the sensitive data is audited.

The design data can be conveniently and securely delivered to the secure consultation system by using a secure network protocol such as secure FTP (SFTP) to transmit encrypted design data over the Internet. In one embodiment, the SFTP transfer protocol requires a two-factor authentication.

The encrypting server 106 can be used to provide a secure means for the owner entity to deliver their design data to the sensitive data storage 115. Once the constraints from the non-disclosure agreement have been incorporated into the encryption appliance 127 (in particular, once the owner entity's permissions, privileges, and cryptographic keys are defined), the owner entity can deliver their sensitive data to the secure network 109. One of the more secure ways to deliver this data is by using Secure FTP to send the data over the Internet in an encrypted form, such that the sensitive data is encrypted while in transit. In one embodiment, the encrypting server 106 executes VanDyke Software's SecureFX® application to provide a secure data transfer capability. The sensitive data can be encrypted when stored on the encrypting server 106 using any appropriate encryption package. In one embodiment, the encryption package uses Vormetric, Inc.'s CoreGuard™ Information Protection System.

Figure 2:
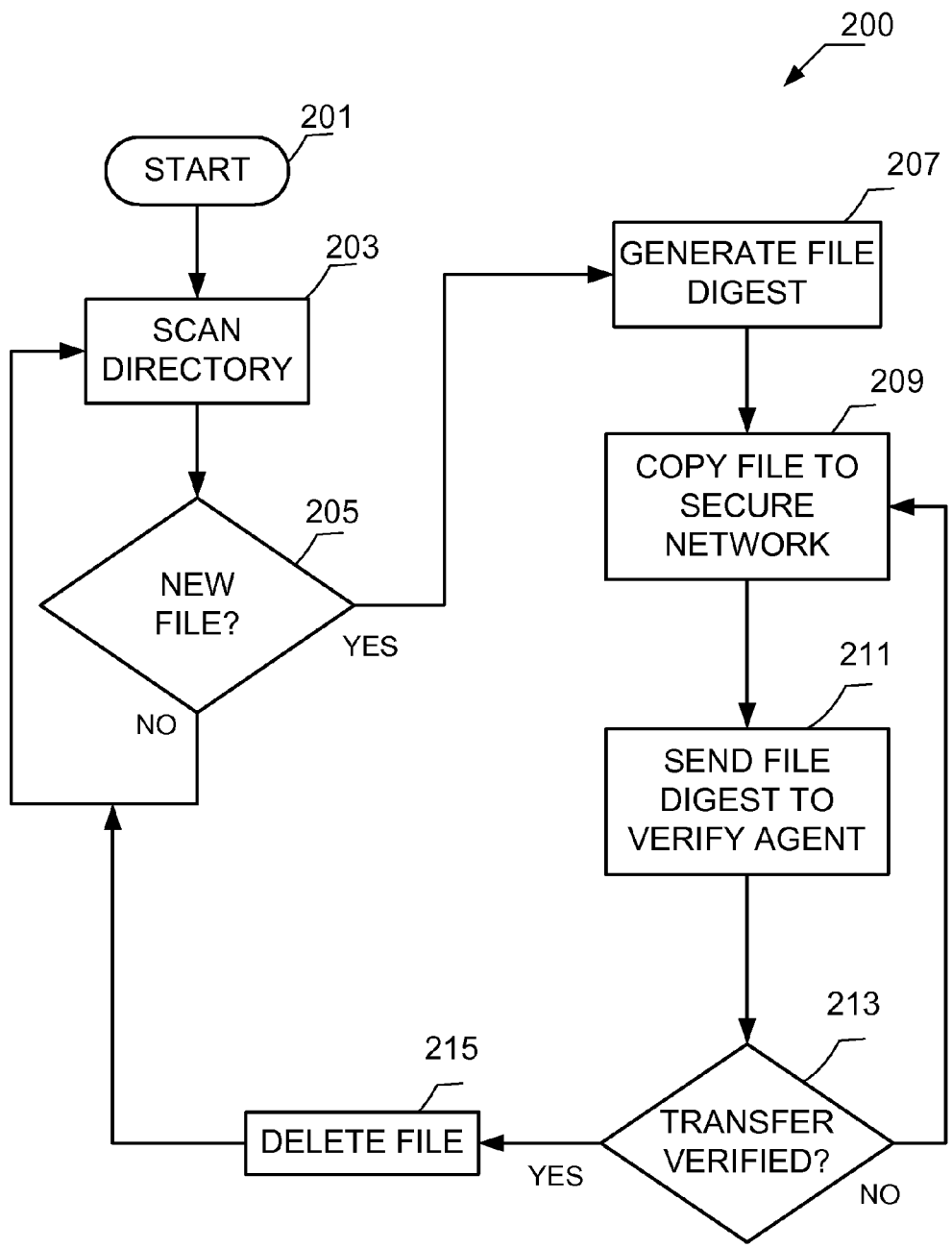
FIG. 2 illustrates an import data process.
Figure 3:
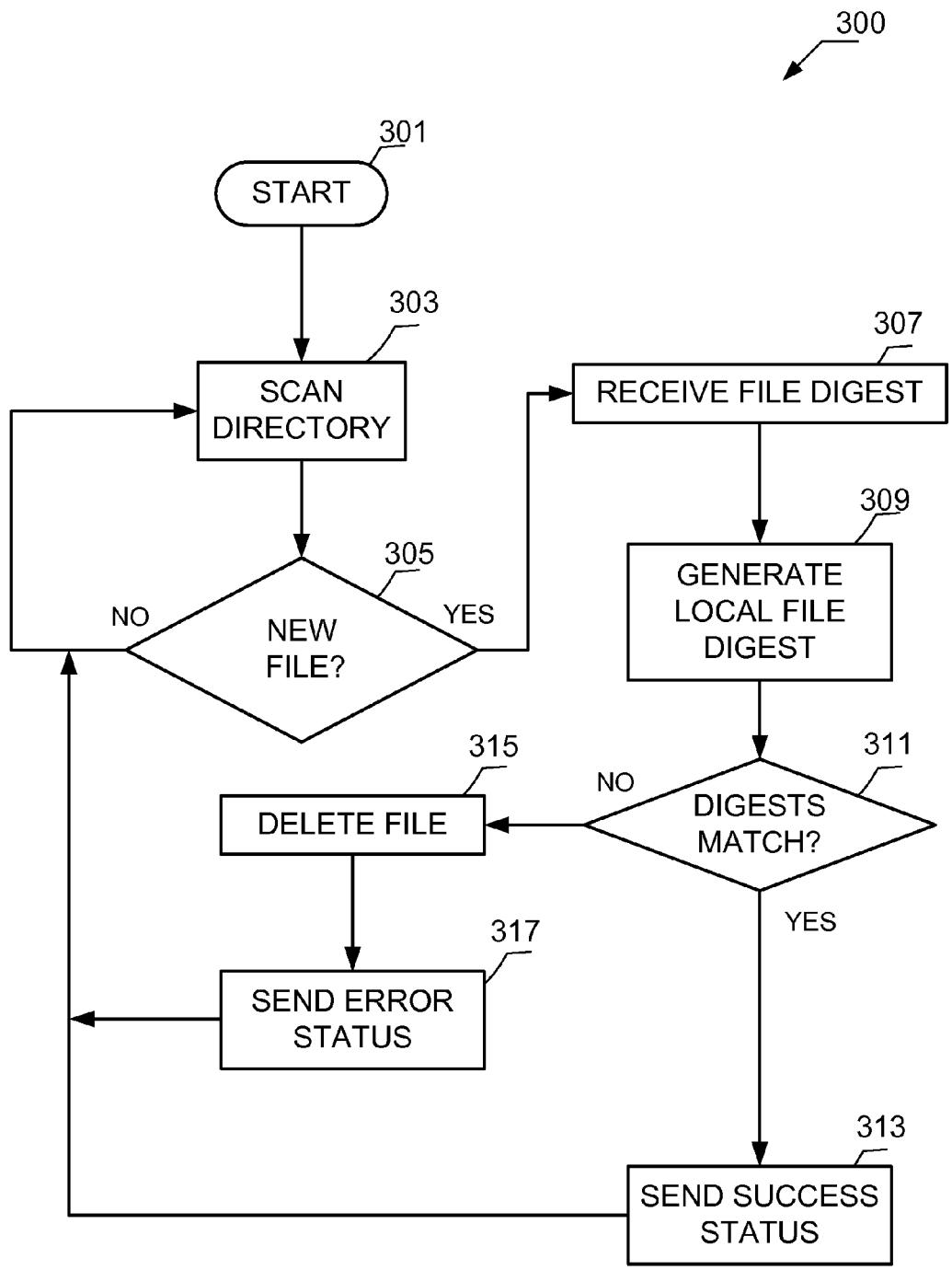
FIG. 3 illustrates a verify agent process.

Once the sensitive data is stored on the encrypting server 106, a program can transfer the sensitive data to the owner mount point on the sensitive data storage 115 within the secure network 109. In one embodiment, the encrypted sensitive data is decrypted, a file digest (for example, a MD5 checksum) of the sensitive data is computed, and the sensitive data and the file digest are transmitted using a secure protocol (such as SFTP, SSH, or other encrypting protocol) from the encrypting server 106 to the sensitive data storage 115 where the file digest is used to verify that the copy was successful. Once the sensitive data has been verifiably copied to the sensitive data storage 115, the encrypted file containing the sensitive data is deleted from the encrypting server 106. As the sensitive data is received from the encrypting server 106, it is encrypted by the encryption appliance 127 and stored (for example, as a relocated file) in the sensitive data storage 115 within an owner mount point. FIG. 2 and FIG. 3 and the accompanying descriptions further describe one embodiment of a data import process that can be used to relocate the sensitive data from the encrypting server 106 to the sensitive data storage 115.

In some embodiments, deletion of a file or owner mount point also includes the execution of a shred and/or scrub application to remove all traces of the sensitive data from the sensitive data storage 115.

The previously discussed technology first decrypted the sensitive data in the encrypting server 106, and copied the sensitive data to the secure network 109 through a secure connection to the sensitive data storage 115, where the data is encrypted by the encryption appliance 127. This approach is useful when the encrypting server 106 and the encryption appliance 127 do not have compatible encryption management capability. For embodiments that do have compatible encryption management capability, the encrypted sensitive data can be copied from the encrypting server 106 to the sensitive data storage 115 without decryption. In this situation, the file digest can be created from the encrypted sensitive data.

In some embodiments, the sensitive data can be delivered to an administrator of the secure network 109 on tangible media that can be read by a computer. For example, this delivery could be accomplished by using a trusted courier to physically deliver the design data to the consultant entity; however, such a courier could be intercepted, robbed, bribed, etc. One skilled in the art will understand that delivery of tangible media containing the sensitive data carries more risk than the previously described network approach.

Within the secure network 109, the owner entity's sensitive data can be encrypted and decrypted by an encryption appliance 127 (for example, NetApp, Inc.'s DataFort™ security storage security appliance) as well as an encryption service 129 residing on the allocated compute server 123.

The local firewall 107 can be a level-4 firewall that can be configured to allow only specific accesses from the local network 105 to the secure network 109. In one embodiment, the local firewall 107 can be configured to disable the transfer of any data or application from the sensitive data storage 115 or the consultant storage 117 to outside of the secure network 109. In one embodiment, the data transferred from within the secure network 109 can be via a virtual network computing protocol over a virtual private network. The local firewall 107 and the intrusion detection/prevention appliance 111 can be configured to prohibit other data transfers within the secure network 109. In one embodiment, the local firewall 107 is configured to deny all file transfers into the secure network 109 except those from the encrypting server 106 to the sensitive data storage 115.

The sensitive data storage 115 can be configured as a redundant storage (as is known to one skilled in the art) to obviate the need for backup media (and its associated risk). The sensitive data can be deleted from the sensitive data storage 115 when it is no longer needed by deleting the file or owner mount point to securely remove any trace of the sensitive data from the sensitive data storage 115.

The local firewall 107 can be configured to allow VPN communications to access the VPN gateway 121 and so allow an authenticated and authorized user access to the virtual network computing server 125 executing in the allocated compute server 123. The VNC protocol is encapsulated by the VPN gateway 121. The local firewall 107 can be configured to detect and log activities of interest such as logon attempts, application execution, file accesses, and file decryption and encryption events, etc., and provide alerts and reports to the specified auditors. By using VPN and VNC, authenticated and authorized users (including personnel of the owner entity as well as personnel of the consultant entity) have access to the application programs stored on the consultant storage 117, and these application programs can access the owner entity's sensitive data stored on the sensitive data storage 115. Thus, the owner entity's personnel and the consultant entity's personnel can identically replicate the owner's problem with the application program and/or sensitive data, and can work together to resolve the owner's problem. The VNC server has its clipboard function disabled, such that the sensitive data cannot be transferred from within the secure network 109 using copy-and-paste GUI functions.

One skilled in the art will understand that the intrusion detection/prevention appliance 111 also can be configured to detect and log activities of interest such as logon attempts, application execution, file accesses, and file decryption and encryption events, etc., and provide alerts and reports to the specified auditors. The intrusion detection/prevention appliance 111 can also monitor and record unusual network traffic flowing over the secure network 109, and can notify the specified auditors when particular events occur. These notifications can be via e-mail, SNMP, or by execution of user-defined programs. In some embodiments the intrusion detection/prevention appliance 111 can block a detected attack (for example, by blocking access to the targeted appliance, blocking access to the targeted appliance from the attacker, dropping the connection, etc.). In addition, the intrusion detection/prevention appliance 111 can identify reconnaissance activity that can be a prequel to an attack. In some embodiments, the intrusion detection/prevention appliance 111 can be configured to perform network behavior analysis to identify attacks that generate unusual network traffic and policy violations. Further, the intrusion detection/prevention appliance 111 can prevent installation of unauthorized patches or updates to application programs stored in the consultant storage 117 or to application/system programs on the compute server bank 119. The local firewall 107 and the intrusion detection/prevention appliance 111 prevent installation of unauthorized patches or updates to the compute server bank 119 and to the consultant storage 117. In one embodiment, the intrusion detection/prevention appliance 111 is provided by 3Com Corporation's TIPPINGPOINT® IPS device.

The sensitive data storage 115 contains the sensitive data for each owner entity. The sensitive data is always stored in an encrypted form. The local firewall 107 and the intrusion detection/prevention appliance 111 are configured so that the sensitive data cannot be transferred outside of the secure network 109. Furthermore, direct access to the owner entity's sensitive data is only provided to application programs executing on the allocated compute server 123 under control of the virtual network computing server 125.

The compute server bank 119 provides a number of compute servers for use by any of the owner entities. In one embodiment, at login, a single one of the compute servers in the compute server bank 119 is assigned to a particular owner entity (such as an allocated compute server 123) to minimize the possibility of some other owner entity being able to access the particular owner entity's sensitive data. Consultant entity and owner entity personnel can operate on the owner entity's sensitive data using application programs from the consultant storage 117. In some embodiments multiple personnel from the owner entity and/or multiple personnel from the consultant entity can simultaneously share the sensitive data storage 115 in the owner mount point if the authentication and authorization of the users allow mounting of the same owner mount point. In some embodiments, the allocated compute server 123 can be shared by users who have access to the same owner mount point.

Encryption can be accomplished by the encryption appliance 127 that encrypts the sensitive data when it is stored on the sensitive data storage 115 (for example, when the sensitive data is relocated from the encrypting server 106). The sensitive data can be decrypted when accessed by the allocated compute server 123 by flowing the encrypted sensitive data through the encryption appliance 127 (once decrypted, the sensitive data flows to the allocated compute server 123 in the clear—but within the secure network 109).

Encryption/decryption of the sensitive data can also be accomplished by the encryption service 129 executing on the allocated compute server 123 and configured to decrypt and encrypt data read from and written to the sensitive data storage 115. This technique keeps the data encrypted even when flowing through the secure network 109.

The owner entity can specify whether their sensitive data can be modified or copied while in the secure network 109. If modifications and/or copies are allowed, such modifications and copies are audited. In one embodiment, such modifications and/or copies are only allowed within the owner entity's owner mount point.

The previous discussion has described the configuration of the secure consultation system site 100. Before the owner entity can transfer its sensitive data to the secure consultation system site 100, the site administrators, system administrators, or other privileged users of the secure consultation system site 100 must initialize the required authorization, authentication, and cryptography characteristics for the owner entity as well as create a corresponding owner mount point on the sensitive data storage 115.

Once an owner entity has recognized an owner's problem that needs consultation with the consultant entity, the owner entity and the consultant entity select personnel from each entity that will have the ability to execute application programs on the sensitive data, as well as specified auditors who will receive reports and event information about accesses to the sensitive data. This understanding is memorialized, for example, by an executed non-disclosure agreement (NDA). From the information in the NDA, the site administrators, system administrators, or other privileged users condition the cryptographic key server 113 to set up the authenticated and authorized users for appropriate access to the sensitive data and identify the specified auditors for event and report notifications. Access to the sensitive data is fine-grained at the logon, application execution, file access, and file decryption/encryption levels. Site administrators, system administrators, or other privileged users are blocked from prohibited access to the owner entity's sensitive data by software agents that provide kernel-mode controls to restrict access by such privileged users. Thus, the site administrators, system administrators, or other privileged users only provide oversight, control, setup, and protection of the secure network 109 in the securely controlled access area.

Once the encryption appliance 127 is conditioned, the authentication and authorization parameters defined, and the owner mount point allocated, the owner entity can send its sensitive data to the secure consultation system site 100 as previously described. Once the owner entity's data resides on the sensitive data storage 115 (for example, in a relocated file), the designated personnel (who are authenticated and authorized users) can VPN into the secure network 109 to obtain VNC access to the allocated compute server 123, and so execute applications that are stored on the consultant storage 117 on the owner entity's sensitive data that is stored on the sensitive data storage 115 within the owner mount point. These resident applications can (if the relocated file's permissions allow) modify or copy the owner entity's sensitive data so long as the copy/modification remains in the owner mount point. In this manner, the consultant entity's personnel and the owner entity's personnel can debug and consult within a secure environment. Note that because the authenticated and authorized user can only access the allocated compute server 123 within the secure network 109, the sensitive data cannot be directly accessed or transferred outside of the securely controlled access area.

Events can be logged by the local firewall 107, the intrusion detection/prevention appliance 111, the cryptographic key server 113, the VPN gateway 121, etc. The specified auditors designated in the NDA receive an audit trail of all users and executables that access the sensitive data as well as account logon/logoff attempts, file accesses, and file decryption attempts, file modifications, file copies, etc. Once the owner's problem is resolved, the sensitive data is no longer needed and is deleted (as well as any other copies or modified copies), and deletion notifications are sent to the specified auditors. In some embodiments, when the owner's problem is resolved, the owner entity's owner mount point is shredded/scrubbed when it is deleted.

FIG. 2 illustrates an import data process 200 that can be used to relocate the owner entity's sensitive data from the encrypting server 106 to a relocated file in the sensitive data storage 115. The import data process 200 executes on the encrypting server 106 and initiates at a start terminal 201 responsive to initialization of the encrypting server 106, in response to an operator command, in response to a cron event, etc. Once initiated, the import data process 200 continues to a 'scan directory' procedure 203 that scans the directories on the encrypting server 106 that are eligible for receiving owner entities' sensitive data. A 'new file' decision procedure 205 determines whether a new file was found in the scanned directories. If no new file was found, the import data process 200 returns to the 'scan directory' procedure 203.

However, if a new file was found (in other words, the encrypting server 106 has completely received sensitive data from the owner entity), the import data process 200 continues to a 'generate file digest' procedure 207 that calculates a file digest (for example, a MD5 checksum) for the newly found file. A 'copy file to secure network' procedure 209 then securely transfers the file to the sensitive data storage 115 through the local firewall 107 (which is configured to allow files to be transferred into the secure network 109 by the encrypting server 106). Also a 'send file digest to verify agent' procedure 211 sends the file digest to a verify agent application within the secure network 109 for processing as subsequently described with respect to FIG. 3. In one embodiment, the encrypting server 106 decodes the sensitive data and generates the file digest as the data is being copied to the sensitive data storage 115 (for example, by using a combination of pipes and filter applications).

After the file digest has been sent to the verify agent application, the import data process 200 eventually receives a result status such as a success or error status message from the verify agent application. If a 'transfer verified' decision procedure 213 determines that the file was successfully transferred to the sensitive data storage 115, then the secure consultation system site 100 continues to a 'delete file' procedure 215 that deletes the sensitive data from the encrypting server 106.

However, if the 'transfer verified' decision procedure 213 received an error status message from the verify agent application, the import data process 200 returns to the 'copy file to secure network' procedure 209 to retry the transfer.

FIG. 3 illustrates a verify agent process 300 that can execute on any computer in the secure network 109. The verify agent process 300 can also execute as a service on the cryptographic key server 113 or on the sensitive data storage 115. The verify agent process 300 initiates at a start terminal 301 responsive to initialization of the computer hosting the verify agent application, in response to an operator command, in response to a cron event, etc. Once initiated, the verify agent process 300 continues to a 'scan directory' procedure 303 that scans the directories on the sensitive data storage 115 that are eligible for receiving owner entities' sensitive data from the encrypting server 106. A 'new file detected' decision procedure 305 determines whether a new relocated file was found in the scanned directories. If no new relocated file was found, the verify agent process 300 returns to the 'scan directory' procedure 303.

However, if a new relocated file was found (in other words, that the sensitive data storage 115 has completely received a file from the encrypting server 106), the verify agent process 300 continues to a 'receive file digest' procedure 307 that receives the file digest sent by the 'send file digest to verify agent' procedure 211 executing on the encrypting server 106. A 'generate local file digest' procedure 309 calculates a file digest for the newly found relocated file. The file digest received by the 'receive file digest' procedure 307 and the newly generated file digest are compared by a 'file digests match' decision procedure 311. If the file digests are the same, the verify agent process 300 continues to a 'send success status' procedure 313 that sends a result status indicating success back to the encrypting server 106 where it is received by the 'transfer verified' decision procedure 213.

If the file digests do not match, the verify agent process 300 continues to a 'delete file' procedure 315 that deletes the relocated file from the sensitive data storage 115 and a 'send error status' procedure 317 that sends a result status indicating failure back to the encrypting server 106, where it is received by the 'transfer verified' decision procedure 213 such that the file transfer can be retried.

One skilled in the art will understand that the 'scan directory' procedure 303 can incorporate a delay, such as by implementing a timer, by causing the import data process 200 to exit and be restarted by a cron event, etc. Such a one will also understand that there are many ways to implement the import data process 200 and the verify agent process 300, and that the sequence of operations implied by FIG. 2 and FIG. 3 is not required to provide equivalent functionality. Such a one will also understand that such functionality can be implemented using scripts or an application that utilizes a threaded design. Such a one will also understand that for clarity error recovery details have not been included. For example, such a one would include logic needed to distinguish files that are partially transferred from files that are completely transferred.

One skilled in the art will understand that the prior description has been of an embodiment where the consultant entity is servicing multiple owner entities. Such a one will understand that the secure consultation system site 100 can be implemented by an owner entity and that the consultant entity's personnel would have equivalent capability for assisting the owner entity's personnel in resolving the owner's problem.

As used herein, a procedure is a self-consistent sequence of steps that can be performed by logic implemented by a programmed computer, specialized electronics or other circuitry, or a combination thereof that leads to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic or combination of the foregoing. In particular, the methods and processes described herein can be implemented with logics.

One skilled in the art will understand that the system described herein provides an extremely secure consulting platform that enables an owner entity to securely store its most secure and private data such that designated personnel of the owner entity and a consultant entity can execute application programs on that data, and thus, enables consultation about the operation and correctness of the application programs and the data.

From the foregoing, it will be appreciated that the technology has (without limitation) the following advantages:

1) A secure and automatic delivery mechanism for transfer of the owner entity's sensitive data from the owner entity to the secure network 109.

2) Continued security of the owner entity's sensitive data (because it is encrypted in storage residing on a secure network 109, it is protected from viewing by privileged accounts, and it cannot be copied out of the secure network 109).

3) Prohibits direct access to the sensitive data because an authenticated and authorized user can only access the sensitive data through application programs residing on the consultant storage 117, and these programs can only be invoked using the virtual network computing client using the VPN gateway 121.

4) Securely generates and stores encryption keys by the cryptographic key server 113 within the secure network 109.

5) Uses "fine-grained" control of authenticated and authorized user access to the sensitive data and the compute server bank 119.

6) Ensures that site administrators, system administrators, or other privileged users are authenticated and operate as intended.

7) Provides a full audit trail of access to the owner entity's sensitive data, and changes of protection related to the sensitive data, as well as automatic notification of changes to secure policies and verification when the owner entity's sensitive data has been deleted.

8) Controls and audits attempts to access sensitive configuration files, logs, etc. and provides "real-time" evidentiary audit of system & data integrity.

9) Provides a secure environment for the owner entity and the consultant entity to investigate the owner's problem.

10) Logically and physically protects the owner entity's design data against both internal and external threats.

11) Prevents installation of unauthorized patches or updates, and prevents unauthorized and altered applications and libraries from launching, e.g., trojans, worms, etc.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color, or material.

What is claimed follows:

1. A method for secure consultation, comprising:
   passing virtual private network communications between a local network and a secure network through a local firewall;
   detecting, by using an intrusion detection appliance, an unauthorized network operation in said secure network;
   providing, by using a cryptographic key server, one or more cryptographic services within said secure network;
   storing sensitive data on a sensitive data storage, wherein said sensitive data is encrypted when stored in said sensitive data storage, and wherein said sensitive data is prohibited from being stored outside an owner mount point on said sensitive data storage;
   storing an application program on an application program storage;
   retrieving said application program from said application program storage;
   executing said application program on a compute server, wherein said application program processes said sensitive data when invoked by an authenticated and authorized user, and wherein said compute server includes a virtual network computing server;
   extending, by using a virtual private network gateway, said secure network through said local firewall to enable a virtual network computing client external to said secure network to communicate with said virtual network computing server;
   encrypting, by using an encryption appliance, said sensitive data as said sensitive data is sent to said sensitive data storage;
   receiving, at an encrypting server that is different from said encryption appliance, said sensitive data using a secure communication protocol, wherein said encrypting server encrypts said sensitive data when stored outside said secure network; and
   verifiably copying, by using the encrypting server, said sensitive data to said sensitive data storage, wherein said sensitive data stored on said sensitive data storage is encrypted by said encryption appliance.

2. The method of claim 1, wherein said compute server encrypts said sensitive data when writing to said sensitive data storage.

3. The method of claim 1, wherein said compute server is one of a plurality of compute servers.

4. The method of claim 1, wherein said intrusion detection appliance prohibits transfer of said sensitive data out of said secure network.

5. The method of claim 1, wherein said intrusion detection appliance, said cryptographic key server, said sensitive data storage, said application program storage, and said compute server are located within a securely controlled access area.

6. The method of claim 1, wherein said owner mount point is one of a plurality of owner mount points.

7. A set of one or more non-transitory computer-readable storage media storing instructions that, when executed by a system comprising one or more computers, causes the system to perform a method for secure consultation, the method comprising:
   passing virtual private network communications between a local network and a secure network through a local firewall;
   detecting, by using an intrusion detection appliance, an unauthorized network operation in said secure network;
   providing, by using a cryptographic key server, one or more cryptographic services within said secure network;
   storing sensitive data on a sensitive data storage, wherein said sensitive data is encrypted when stored in said sensitive data storage, and wherein said sensitive data is prohibited from being stored outside an owner mount point on said sensitive data storage;
   storing an application program on an application program storage;
   retrieving said application program from said application program storage;
   executing said application program on a compute server, wherein said application program processes said sensitive data when invoked by an authenticated and authorized user, and wherein said compute server includes a virtual network computing server;
   extending, by using a virtual private network gateway, said secure network through said local firewall to enable a virtual network computing client external to said secure network to communicate with said virtual network computing server;
   encrypting, by using an encryption appliance, said sensitive data as said sensitive data is sent to said sensitive data storage;
   receiving, at an encrypting server that is different from said encryption appliance, said sensitive data using a secure communication protocol, wherein said encrypting server encrypts said sensitive data when stored outside said secure network; and
   verifiably copying, by using the encrypting server, said sensitive data to said sensitive data storage, wherein said sensitive data stored on said sensitive data storage is encrypted by said encryption appliance.

8. The set of one or more non-transitory computer-readable storage media of claim 7, wherein said compute server encrypts said sensitive data when writing to said sensitive data storage.

9. The set of one or more non-transitory computer-readable storage media of claim 7, wherein said compute server is one of a plurality of compute servers.

10. The set of one or more non-transitory computer-readable storage media of claim 7, wherein said intrusion detection appliance prohibits transfer of said sensitive data out of said secure network.

11. The set of one or more non-transitory computer-readable storage media of claim 7, wherein said intrusion detection appliance, said cryptographic key server, said sensitive data storage, said application program storage, and said compute server are located within a securely controlled access area.

12. The set of one or more non-transitory computer-readable storage media of claim 7, wherein said owner mount point is one of a plurality of owner mount points.

13. An apparatus, comprising:
   one or more processors; and
   one or more non-transitory computer-readable storage media storing instructions that, when executed by the one or more processors, causes the apparatus to perform a method for secure consultation, the method comprising:
      passing virtual private network communications between a local network and a secure network through a local firewall;
      detecting, by using an intrusion detection appliance, an unauthorized network operation in said secure network;
      providing, by using a cryptographic key server, one or more cryptographic services within said secure network;

storing sensitive data on a sensitive data storage, wherein said sensitive data is encrypted when stored in said sensitive data storage, and wherein said sensitive data is prohibited from being stored outside an owner mount point on said sensitive data storage;

storing an application program on an application program storage;

retrieving said application program from said application program storage;

executing said application program on a compute server, wherein said application program processes said sensitive data when invoked by an authenticated and authorized user, and wherein said compute server includes a virtual network computing server;

extending, by using a virtual private network gateway, said secure network through said local firewall to enable a virtual network computing client external to said secure network to communicate with said virtual network computing server;

encrypting, by using an encryption appliance, said sensitive data as said sensitive data is sent to said sensitive data storage;

receiving, at an encrypting server that is different from said encryption appliance, said sensitive data using a secure communication protocol, wherein said encrypting server encrypts said sensitive data when stored outside said secure network; and verifiably copying, by using the encrypting server, said sensitive data to said sensitive data storage, wherein said sensitive data stored on said sensitive data storage is encrypted by said encryption appliance.

14. The apparatus of claim 13, wherein said compute server encrypts said sensitive data when writing to said sensitive data storage.

15. The apparatus of claim 13, wherein said compute server is one of a plurality of compute servers.

16. The apparatus of claim 13, wherein said intrusion detection appliance prohibits transfer of said sensitive data out of said secure network.

17. The apparatus of claim 13, wherein said intrusion detection appliance, said cryptographic key server, said sensitive data storage, said application program storage, and said compute server are located within a securely controlled access area.

18. The apparatus of claim 13, wherein said owner mount point is one of a plurality of owner mount points.

* * * * *